(12) United States Patent
Chefetz et al.

(10) Patent No.: US 9,095,125 B2
(45) Date of Patent: Aug. 4, 2015

(54) RETRACTABLE LEASH WITH PLIABILE HANDLE

(71) Applicant: Wigzi LLC, Washington, DC (US)

(72) Inventors: Nathan Chefetz, Washington, DC (US); Cade Goldenberg, Washington, DC (US)

(73) Assignee: WIGZI, LLC, Washington, DC (US)

( * ) Notice: Subject to any disclaimer, the term of this patent is extended or adjusted under 35 U.S.C. 154(b) by 0 days.

(21) Appl. No.: 14/459,623

(22) Filed: Aug. 14, 2014

(65) Prior Publication Data

US 2015/0075447 A1 Mar. 19, 2015

Related U.S. Application Data

(60) Provisional application No. 61/960,303, filed on Sep. 16, 2013.

(51) Int. Cl.
*A01K 27/00* (2006.01)

(52) U.S. Cl.
CPC .................................. *A01K 27/004* (2013.01)

(58) Field of Classification Search
CPC . A01K 27/003; A01K 27/005; A01K 27/004; A63B 21/055
USPC .................... 119/796, 797, 798, 795
See application file for complete search history.

(56) References Cited

U.S. PATENT DOCUMENTS

| | | | |
|---|---|---|---|
| 2,541,851 A | 2/1951 | Wright | |
| 4,165,713 A * | 8/1979 | Brawner et al. | 119/794 |
| 5,740,764 A * | 4/1998 | Jacobsen | 119/798 |
| 5,901,668 A * | 5/1999 | Goodger, Sr. | 119/795 |
| 6,085,696 A * | 7/2000 | Fisher | 119/798 |
| 6,247,428 B1 | 6/2001 | Mireles | |
| 6,439,168 B1 | 8/2002 | Maglich et al. | |
| 6,792,893 B1 | 9/2004 | Quintero et al. | |
| 6,886,499 B2 | 5/2005 | Meissner | |
| 7,188,585 B1 * | 3/2007 | Carter | 119/798 |
| 7,207,296 B2 | 4/2007 | DiDonato | |
| 7,234,205 B2 * | 6/2007 | Blauer et al. | 16/431 |
| 7,455,034 B2 | 11/2008 | DiDonato | |
| 7,559,292 B2 | 7/2009 | Blandford | |
| 7,797,782 B2 | 9/2010 | Davis et al. | |
| 7,980,202 B2 | 7/2011 | Bentz et al. | |
| 8,061,305 B2 * | 11/2011 | Sugalski | 119/795 |
| 8,256,384 B2 * | 9/2012 | Wheeler et al. | 119/795 |
| 8,256,385 B2 | 9/2012 | Goldenberg | |
| 8,336,505 B2 * | 12/2012 | Lopusnak et al. | 119/796 |
| 8,393,302 B1 * | 3/2013 | Blakemore | 119/796 |
| 8,683,960 B2 | 4/2014 | O'Brien et al. | |
| 2003/0110585 A1 | 6/2003 | Rechelbacher | |
| 2007/0039561 A1 | 2/2007 | Tarlton | |
| 2011/0067649 A1 | 3/2011 | O'Brien et al. | |
| 2012/0079994 A1 * | 4/2012 | Chefetz | 119/796 |
| 2012/0318212 A1 | 12/2012 | Montenegro | |
| 2014/0096721 A1 | 4/2014 | Millard | |
| 2014/0216361 A1 | 8/2014 | Chung | |

* cited by examiner

*Primary Examiner* — Yvonne Abbott-Lewis
(74) *Attorney, Agent, or Firm* — Buchanan Ingersoll & Rooney PC

(57) ABSTRACT

A leash assembly includes lead line that is extendable out of and retractable into housing attached to a pliable handle or is affixed to a pliable handle. In embodiments where the leash is retractable and extendable from the housing, a pliable handle may be directly attached to the housing. The pliable handle can be comprised of gel or other pliable material so that a force from a user can deform a shape of the handle to reduce fatigue associated with holding onto the handle while walking a pet or otherwise having the leash attached to a pet animal.

20 Claims, 4 Drawing Sheets

RETRACTABLE LEASH WITH PLIABILE HANDLE

CROSS-REFERENCE TO RELATED APPLICATIONS

The present application claims priority to U.S. Provisional Patent Application No. 61/960,303, which was filed on Sep. 13, 2013.

TECHNICAL FIELD

The present disclosure relates to leashes for walking a pet.

BACKGROUND

Leashes are often used to walk a pet, such as a dog. Examples of such a leash can be appreciated from U.S. Pat. No. 8,256,385. The entirety of U.S. Pat. No. 8,256,385 is incorporated by reference herein.

Leashes can be difficult to hold. For example, some leashes can house retractable leashes in a handle that is relatively large and bulky. The handle is also usually made of a rigid material such as a rigid plastic. A user of such a leash can have difficulty keeping such leashes in their hand. Such leashes can also cause finger and hand fatigue for users that walk a pet for a prolonged period of time.

SUMMARY

According to aspects illustrated herein, there is provided a leash for a pet that comprises a pliable handle and a lead line that is one of: (a) retractable and extendable from a housing to which the handle is attached and (b) attached directly to the handle.

According to other aspects illustrated herein, there is provided a method of controlling a pet animal that includes at least the steps of putting a leash on the pet and using the handle of the leash to direct movement of the pet. The leash can comprise a pliable handle and a lead line that is one of: (a) retractable and extendable from a housing to which the handle is attached and (b) attached directly to the handle.

The above described and other features are exemplified by the following figures and detailed description.

BRIEF DESCRIPTION OF THE DRAWINGS

Referring now to the figures, which are exemplary embodiments, and wherein the like elements are numbered alike.

Figure 1:
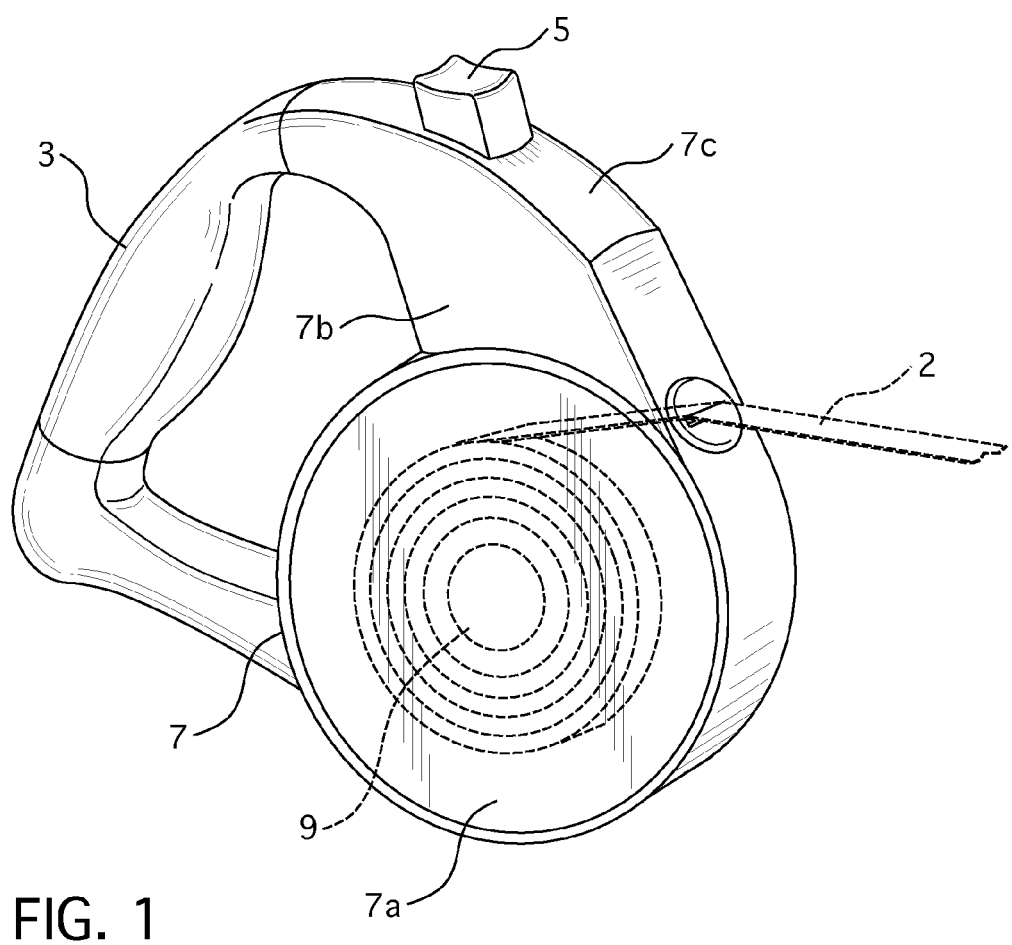
FIG. 1 is a perspective view of an exemplary embodiment of a leash for a pet that includes a pliable handle 3 attached to a housing 7 that is attached to a lead line 2 that is retractable and extendable from the housing 7. An exemplary embodiment of a lead line 2 and an exemplary embodiment of a winding and unwinding mechanism 9 for the lead line 2 that includes a spool about which the lead line 2 is windable and unwindable is shown in broken line in FIG. 1.
Figure 2:
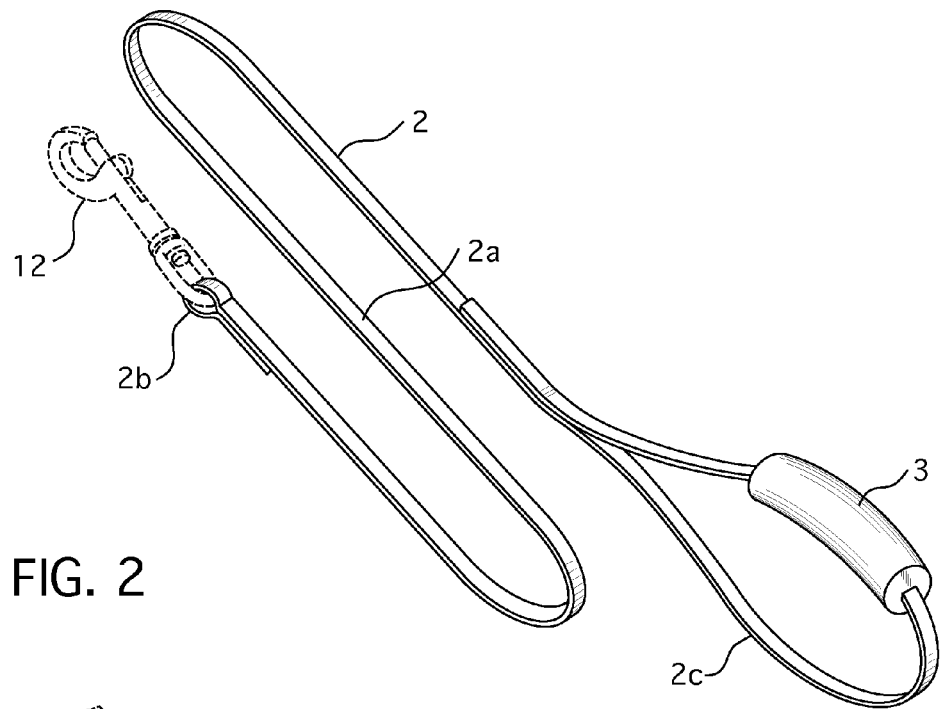
FIG. 2 is a schematic perspective view of an exemplary embodiment of a leash for a pet. A connector 12 that is attachable to an end of the lead line 2 is shown in broken line in FIG. 2.

Other details, objects, and advantages of embodiments of the innovations disclosed herein will become apparent from the following description of exemplary embodiments and associated exemplary methods.

DETAILED DESCRIPTION

As may be appreciated from FIGS. 1-5, disclosed herein is a leash for a pet, such as a dog, a cat, a rabbit, or other non-human animal that is kept as a pet. The leash can include a lead line 2. The lead line can be retractably and extendably attached to a housing to which a pliable handle 3 is connected. A pliable handle 3 can be directly attached to the housing 7. The pliable handle 3 can be configured to permit a user to more easily hold onto the leash and reduce finger and hand fatigue when the user walks a pet to which the leash is connected. At least one spool of a winding and unwinding mechanism 9 can be enclosed within the housing 7 and the lead line 2 can be attached to the spool such that the lead line is windable and unwindable from the spool. The spool can also be considered a reel, a wheel, or other structure that can rotate in one direction to wind up the lead line 2 and rotate in an opposite direction when the lead line is unwound from the spool and extended therefrom. The spool can be biased to wind the lead line to retract the lead line within the housing 7 via a spring mechanism or other type of biasing mechanism. Actuation of one or more actuators 5 such as buttons or sliders can be configured to adjust the biasing mechanism or brake mechanism to effect a winding of the lead line 2 about the spool or permit force exerted by an animal to which the lead line is connected to unwind the lead line from the spool and permit the lead line to extend out of the housing 7. A lock mechanism can also be connected to the spool and can be actuatable to lock the spool and prevent any further unwinding of the lead line when the lock mechanism is moved to a locked position. In one embodiment, a brake mechanism such as a brake and/or a brake lock can be connected to the spool of the winding and unwinding mechanism 9 to provide a force that may exert a locking force on the spool and/or a biasing force on the spool to prevent rotation of the spool to prevent further extension of the lead line out of the housing 7.

In some embodiments, the lead line 2 of the leash can be directly connected to a pliable handle 3 instead of being extendable and retractable from a housing 7 that is attached to the pliable handle. For instance, the lead line 2 can be affixed to the pliable handle 3 by a fastener, coupling, an adhesive, or other fastening mechanism. For example, in some embodiments the pliable handle 3 may be structured to have an annular shape, a ring-like shape, a generally U-shape, a generally C-shape, or other shape and have its inner core 37 overmolded onto or otherwise adhered to or joined with the lead line 2. A sheath 33 may attached to the core 37 and be sized and configured to enclose a pliable material 35 within a space defined between the sheath 33 and the core 37.

The lead line 2 can have a first terminal end 2b attached to a connector 12. The connector 12 can be configured to attach to a collar or harness that can be sized and configured for being worn by a pet. For instance, the collar can be configured to be positioned around the neck of a dog, cat, or rabbit to be worn by the pet and the connector may be connected to that collar. As another example, a harness may be worn by a pet and have a ring or other connector element to which the connector 12 is releaseably attachable. In some embodiments, the connector 12 can be a clip, a clasp, or other type of connector that can be attached to a ring or other element of a collar or harness to connect the lead line to the collar or harness.

The lead line 2 can also have a second terminal end 2c opposite the first terminal end 2b and a middle portion 2a that is between the first and second terminal ends 2b and 2c. The lead line 2 can be configured as an elongated member. For instance, the lead line 2 can be configured as an elongated strap, an elongated elastomeric member such as, for example, a bungee cord, an elongated cable, an elongated wire, a rope, or other type of flexible elongated member.

The pliable handle 3 can include an inner core 37 and an outer sheath 33 that surrounds the core 37 to define a space between the core and the sheath, and a pliable material 35 within the space between the core and the sheath. The space in which the pliable material 35 is positioned may be entirely enclosed by the sheath 33 and the core 37. The sheath may cover and outer portion of the space and the core may cover an inner portion of the space and ends of the space defined between the core 37 and the sheath 33. The outer sheath 33 may be molded onto the core, may be adhered to the core, may be welded onto the core, may be fastened to the core, or may otherwise be connected or fastened to the core to define the space between the inner core 37 and the outer sheath 33.

The pliable material 35 can be positioned within the space between the core 37 and sheath 33 so that the pliable material 35 is moveable within the space in response to force exerted on the sheath 33. For instance, when a user holds the handle, the pliable material 35 may move within the space in response to the force exerted by the user's hand holding onto the handle so that more material moves away form a location in which the user is exerting substantive force toward locations in the space that are not being directly grasped by a user's hand.

The pliable material 35 can be any number of suitable materials. For instance, the pliable material 35 can be a liquid such as liquid water, a gel, a gas such as air, a putty, or a dilatant fluid. For example, a putty as disclosed in U.S. Pat. No. 2,541,851 can be used as the pliable material. As another example, other types of putty, a fluid, a gel, a liquid or a gas could be used as the pliable material. In some embodiments, the pliable material may substantially fill the space between the sheath 33 and the core 37 and be in contact with the sheath 33 and the core 37 while within the space defined between the core 37 and the sheath 33. For instance, the pliable material can fill 50-100% of the volume of the space, may fill between 65-100% of the volume of the space, or can file between 90-100% of the volume of the space. In some embodiments, the pliable material could be a mixture of materials such as air mixed with putty, or air mixed with a liquid within the space defined between the sheath 33 and core 37.

The core 37 can be configured as a member that is stiffer than the sheath and is also stiffer than the pliable material. In some embodiments, the core can be configured as an elastomeric member, a wood member, a metal member, or a plastic member. For example, the core can be configured as a tubular or cylindrical rubber member or an elongated plastic member that has a polygonally shaped cross-section. As another example, the core could be configured as a solid member, a hollow member, a tubular member, or an annular structure (e.g. a ring-like structure). The core can also be structured to include protuberances or projections that extend toward the sheath to facilitate the pliable material moving within the space to form grooves, ridges, bumps, furrows, or other demarcations in response to the user grasping the handle 3 and exerting a force on the sheath 33 and pliable material 35 to facilitate the pliable material moving within the space to define a particular shape that may allow the user to more easily grip the pliable handle 3.

The sheath 33 can be composed of a resilient material such as a resilient polymeric material or an elastomeric material. For instance, the sheath 33 can be composed of rubber in some embodiments. The sheath 33 can be configured so that the sheath 33 is deformable when attached to the core 37 so that a force exerted by a user's hand is translated to the pliable material 35 within the space defined between the sheath and the core of the handle. The sheath 33 can be transparent such that the pliable material 35 is visible through the sheath 33. Alternatively, the sheath 33 can be opaque such that the pliable material 35 is not visible through the sheath.

The pliable handle 3 can be configured to have any number of shapes for different embodiments of the leash. For example, the pliable handle 3 can be shaped as an elongated member or other type of elongated element that has a first end 3a and a second end 3b opposite the first end. The first and second ends can each be affixed to different portions of a housing 7 adjacent an outer edge of the housing such that a gap is defined between the handle and a middle portion of the housing 7b that is inwardly located relative to the handle. The gap between this middle portion of the housing and the pliable handle can have any type of size and configuration. For instance, the gap can be sized to accommodate a portion of a user's hand that may grasp the handle.

The first and second ends of the handle 3a and 3b can each be attached to the housing 7 by the same type of fastening mechanism. Alternatively, each end can utilize a different type of fastening mechanism. For instance, the first end 3a of the handle can be directly attached to the housing via a rivet, a pin that mates within holes in the housing, a bolt, a screw, an interlocking feature that interlocks with a mating interlocking feature formed in the housing, at least one aperture that receives one or more projections extending from the housing, or other fastening mechanism. The second end 3b of the handle can also be directly attached to the housing via a rivet, a pin that mates within holes in the housing, a bolt, a screw, at least one aperture that receives one or more projections extending from the housing, an interlocking feature that interlocks with a mating interlocking feature formed in the housing, or other fastening mechanism. For example, in some embodiments, the pliable handle 3 can include at least one first hole 41a in a first end 3a of the handle and at least one second hole 41b in the second end 3b of the handle. Each of these holes can be sized to receive a fastener, such as a screw or bolt, that can be passed through the hole for attaching the handle 3 to the housing.

As an alternative, each of the holes can be sized so that a peg or other structure that is positioned within the housing passes through a hole for attaching the handle 3 to the housing. The peg or other structure may be integrally formed on a portion of the housing and be configured for interconnecting with another portion of the housing. For instance, each peg 45 or other structure can be passed through a hole in the handle and have a distal end that engages another portion of the housing for connecting the handle within the housing. For instance, each peg 45 or other structure could pass through a respective hole in the handle (e.g. first hole 41a or second hole 41b) and into a respective opening 45a defined in an internal portion of the housing for interlocking with the peg 44 or other structure. For such embodiments, opening 45a that is to receive a respective peg 45 or other structure would be aligned with a respective hole of the handle 3 so that the peg or other structure could pass through the handle and into the opening defined in the housing. It is contemplated that the use of pegs 45 and openings 45a can permit the same structure used to interconnect two sides of a housing to form the housing to also connect the pliable handle to the housing during assembly of embodiments of the leash.

In some embodiments, the housing can also be configured to facilitate connection to the first and second ends 3a, 3b of the pliable handle 3 so that positioning of the outer sheath 33 of the handle 3 can also be maintained. For example, the outer sheath 33 that can cover the exterior of the handle and help contain the pliable material 35 can extend from the distal first end 3a of the handle 3 to the distal second end 3b of the handle. The housing can have first and second spaced part portions 43a and 43b that oppose each other that are configured to engage the ends of the sheath 33 to help keep the sheath from slipping down or otherwise becoming disconnected from the handle. Holes 41a and 41b formed in opposite ends of the handle may pass through the sheath 33 as well as the core 37 and pliable material 35 between the core 37 and sheath 33. For such embodiments, the fastener (e.g. bolt, screw, peg, or other structure or fastener element) that pass through the holes 41a, 41b for attachment of the handle 3 to the housing can be configured to also engage the ends of the sheath 33 to help keep the sheath 33 in place to help keep the pliable material between the sheath 33 and core 37 enclosed and also help prevent the sheath 33 from becoming disconnected from the core 37. In some embodiments, the ends of the sheaths may not have holes that align with holes 41a and 41b until the fasteners are passed through the ends of the sheath and into the holes 41a and 41b. In passing through the sheath 33 for passing through holes 41a and 41b, the fasteners may form holes in the sheath 33 and also include a head or other portion that is positioned in direct contact with the end portions of the sheath to engage the sheath 33 to help ensure the sheath 33 stays adequately positioned for complete enclosure of the pliable material between the sheath 33 and the core 37. The fasteners can also help prevent the sheath from twisting or sliding in a sideways direction (e.g. twisting about a circumference or perimeter of the sheath, sliding laterally such as sliding horizontally, sliding leftwardly or sliding rightwardly relative to the core 37) and can also help prevent the sheath from sliding relative to the core 37 longitudinally (e.g. in a direction away from the first end 3a of the handle or in a direction away from the second end 3b of the handle).

The housing 7 can also be configured to facilitate the entrapment of the pliable material between the sheath 33 and the core 37. For instance, spaced apart opposing portions 43a and 43b of the housing can each define a hole or other aperture for receiving a respective end of the handle 3. That structure can include a ridge, teeth, or other structure that pinches the sheath 33 or otherwise engages the sheath 33 to help retain the position of the sheath 33 to help keep the sheath in position for retaining the pliable material between the sheath 33 and the core 37. Such a ridge, teeth, or other structure can interlock with a part of the sheath 33 that is configured to mate with the ridge, teeth or other structure to help prevent the pliable material from leaking out of the handle in response to a user exerting a force on the handle that results in the pliable handle moving with the space defined between the sheath 33 and the core 37. For instance, the sheath 33 can have teeth, one or more ridges, or other structure that adjacent opposite ends of the sheath for interlocking with the ridge, teeth or other structure defined in the opposing portions 43a and 43b of the housing.

In embodiments where the pliable handle 3 is directly attached to a lead line 2, the core 37 of the handle can be attached to the lead line 2 in a number of different ways. For instance, the core 37 may be a polymeric material or elastomeric material that is over molded onto a portion of the lead line. As another example, the inner core 37 can be adhered or mechanically fastened to the lead line for direct attachment to the lead line.

Figure 3:
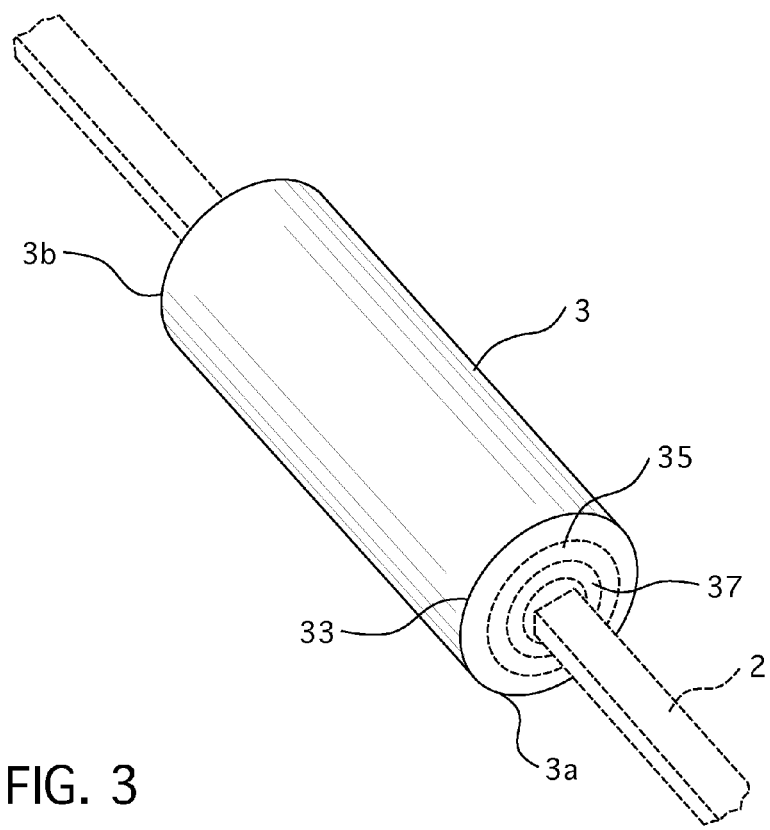
FIG. 3 is a schematic perspective view of an exemplary embodiment of a pliable handle 3 that is included within the exemplary leashes shown in FIGS. 1 and 2. A lead line 2 that can be directly connectable to the pliable handle 3 as shown in FIG. 2 is illustrated in broken line. An inner portion of the sheath 33 and pliable material 35 are shown in broken line to indicate where those elements can be attached to an end of the core 37.
Figure 4:
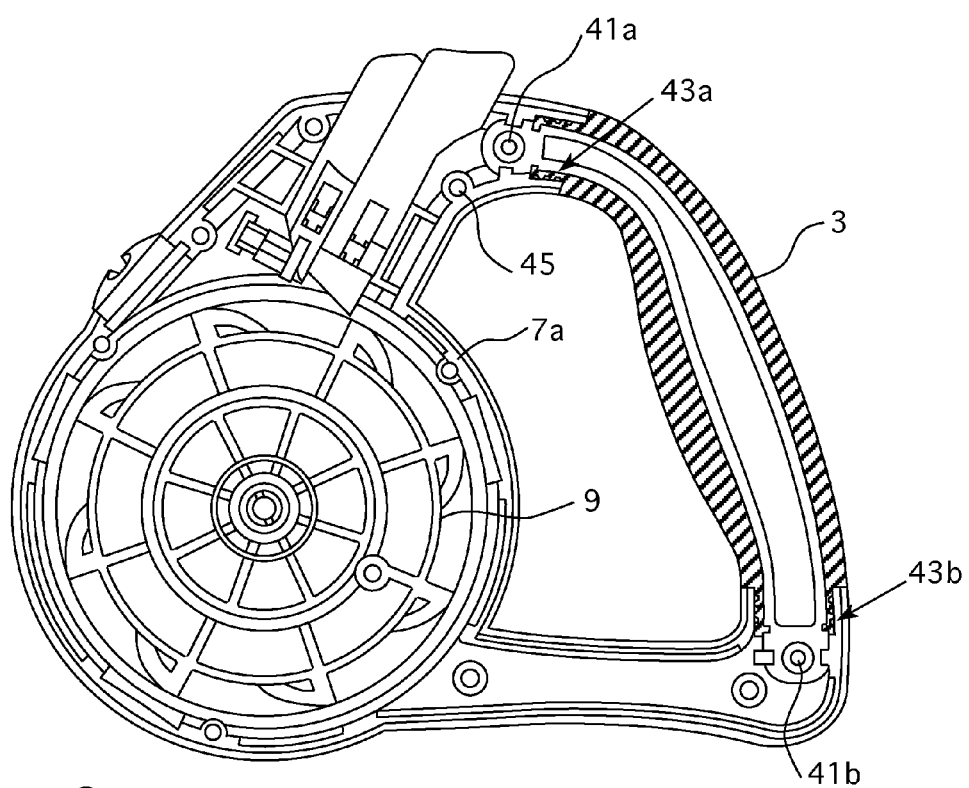
FIG. 4 is a cross section view of the exemplary embodiment of a leash for a pet that includes the pliable handle 3 connected to the housing 7 for attachment to a lead line 2 that is retractable and extendable to and from the housing 7.
Figure 5:
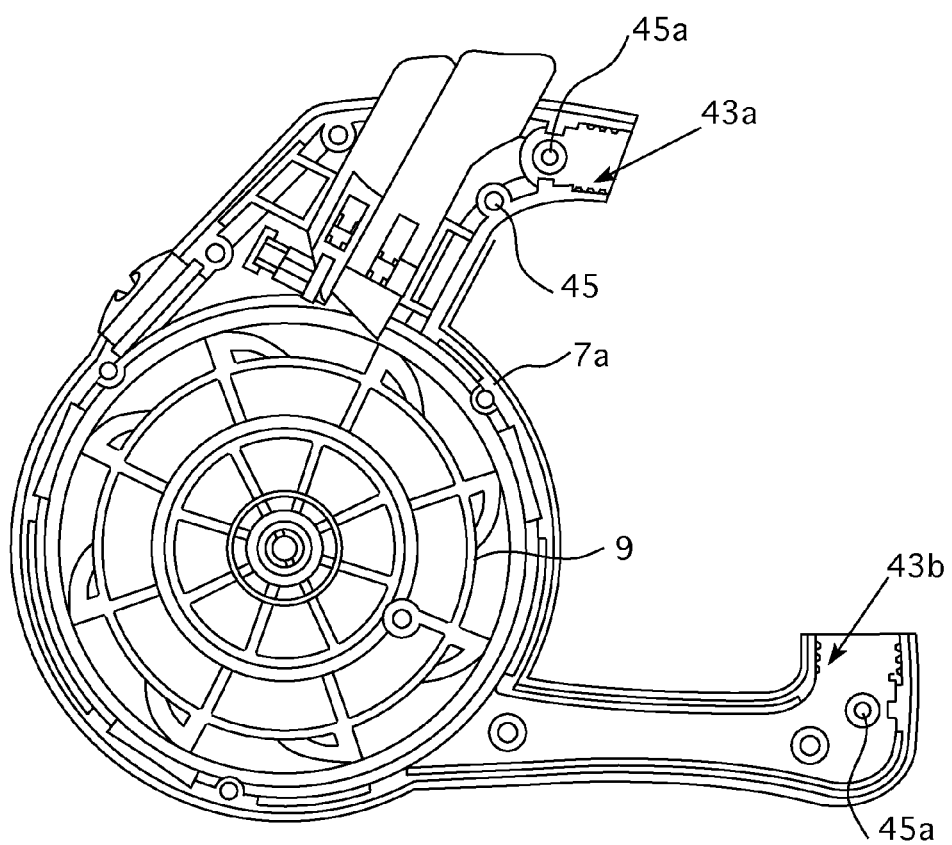
FIG. 5 is a cross sectional view of the exemplary embodiment of the leash shown in FIG. 4 with the pliable handle 3 cut away.

As yet another example, the inner core 37 may be a tubular structure that has an inner channel defined therein and a portion of the lead line 2 may pass through that inner channel as illustrated in broken line in FIG. 3. For example, the lead line 2 may have a first terminal end 2b that has a connector for attachment to a collar of a pet and a second end 2c that defines an annular shape such as a ring-like shape. A middle portion 2b of the lead line can be located between the first and second ends of the lead line 2b and 2c. The annular shaped second end of the lead line 2c can have a portion that passes through the inner channel of the core for moveable attachment to the pliable handle. For such embodiments, the annular end shaped portion may be unformed during manufacturing and the section of the lead line to be formed as the annular shaped end portion can be passed through the inner channel of the core prior to the second annular shaped end portion of the lead line being formed by attaching that portion to another portion of the lead line or otherwise manipulating that portion to form the annular shaped structure of the lead line via sewing, molding, or otherwise forming that annular shaped second end portion of the lead line.

A method of controlling a pet animal is also provided. The method can include the step of putting a leash on the pet. The leash can be an embodiment of the leash discussed herein. For example, the leash can include a pliable handle and a lead line that is one of: (a) retractable and extendable from a housing to which the handle is attached and (b) attached directly to the handle. The handle of the leash can then be grasped by a user and used to direct or control movement of the pet. When the user grasps the handle, the user may cause the pliable material to move within the space defined between the sheath and the core of the handle when holding the leash to use the handle to direct movement of the pet. Such a force may be exerted by one or more hands of the user or by one or more fingers of the user, for example.

It should be appreciated that various changes can be made to embodiments of the leash and leash handle. For example, the size, shape or configuration of the pliable handle can be any of a number of suitable shapes. As another example, the leash lead line 2 can be any type of lead line suitable for controlling or otherwise directing motion of a pet. The pet can be any type of non-human animal such as a dog, cat, rabbit, or other pet animal. As yet another example, a housing 7 may be configured to retractably and extendably retain multiple lead lines about one spool within the housing 7 or within multiple spools enclosed within the housing 7. As yet another example, the shape and size of the housing can have any of a number of different configurations. For example, the housing may have a top section 7c that is configured to slidably attach to actuators 5 for controlling the windability of one or more lead lines that are extendable and retractable out of at least one aperture of the housing 7. As another example, the lead line enclosing portion 7a of the housing can be configured to enclose an entirety of at least one spool and winding mechanism for retractably and extendably retaining at least one lead line 2.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A leash for a pet, comprising:
    a pliable handle; and
    a lead line that is one of: (a) retractable and extendable from a housing to which the handle is attached and (b) attached to the handle;
    wherein the pliable handle comprises:
        a core;
        an outer sheath that surrounds the core to define a space between the core and the sheath; and
    a pliable material within the space between the core and the sheath, the pliable material being moveable within the space in response to force exerted on the sheath, wherein the pliable material is a liquid.

2. A leash for a pet, comprising:
    a pliable handle; and
    a lead line that is one of: (a) retractable and extendable from a housing to which the handle is attached and (b) attached to the handle;
    wherein the pliable handle comprises:
        a core;
        an outer sheath that surrounds the core to define a space between the core and the sheath; and
    a pliable material within the space between the core and the sheath, the pliable material being moveable within the space in response to force exerted on the sheath, wherein the pliable material is a gel.

3. The leash of claim 2, wherein the lead line has a fixed length and is attached directly to the handle, the lead line being comprised of one of: a wire, a cable, an elongated strap, and an elongated elastomeric member.

4. The leash of claim 2, wherein the lead line is attached to a connector configured to attach the leash to a collar or harness for the pet.

5. The leash of claim 2, wherein the lead line is retractable and extendable form the housing, the handle being directly attached to the housing, at least one spool being enclosed within the housing, the lead line being attached to the spool such that the lead line is windable and unwindable from the spool.

6. The leash of claim 2, wherein the core is comprised of member that is stiffer than the sheath and is also stiffer than the pliable material.

7. The leash of claim 2, wherein the core is comprised of an elastomeric member or a resilient member.

8. The leash of claim 2, wherein the sheath is transparent such that the pliable material is visible through the sheath.

9. A leash for a pet, comprising:
    a pliable handle; and
    a lead line that is one of: (a) retractable and extendable from a housing to which the handle is attached and (b) attached to the handle;
    wherein the pliable handle comprises:
        a core;
        an outer sheath that surrounds the core to define a space between the core and the sheath; and
    a pliable material within the space between the core and the sheath, the pliable material being moveable within the space in response to force exerted on the sheath, wherein the pliable material is a gas.

10. A leash for a pet, comprising:
    a pliable handle; and
    a lead line that is one of: (a) retractable and extendable from a housing to which the handle is attached and (b) attached to the handle;
    wherein the pliable handle comprises:
        a core;
        an outer sheath that surrounds the core to define a space between the core and the sheath; and
    a pliable material within the space between the core and the sheath, the pliable material being moveable within the space in response to force exerted on the sheath, wherein the pliable material is a putty.

11. The leash of claim 10, wherein the sheath is transparent such that the pliable material is visible through the sheath or wherein the sheath is opaque such that the pliable material is not visible through the sheath.

12. A leash for a pet, comprising:
    a pliable handle; and
    a lead line that is one of: (a) retractable and extendable from a housing to which the handle is attached and (b) attached to the handle;
    wherein the pliable handle comprises:
        a core;
        an outer sheath that surrounds the core to define a space between the core and the sheath, wherein the sheath has a first end a second end that is opposite the first end of the sheath;
    a pliable material within the space between the core and the sheath, the pliable material being moveable within the space in response to force exerted on the sheath;
    a first fastener being positioned through a portion of the first end of the sheath to attach the first end of the sheath to the core and to attach a first end of the handle to the housing; and
    a second fastener being positioned through a portion of the second end of the sheath to attach the second end of the sheath to the core and to attach a second end of the handle to the housing.

13. A leash for a pet, comprising:
    a pliable handle; and
    a lead line that is one of: (a) retractable and extendable from a housing to which the handle is attached and (b) attached to the handle;
    wherein the pliable handle comprises:
        a core;
        an outer sheath that surrounds the core to define a space between the core and the sheath; and
    a pliable material within the space between the core and the sheath, the pliable material being moveable within the space in response to force exerted on the sheath;
    wherein the pliable handle has a first end and a second end opposite the first end, the first and second ends being affixed to different portions of the housing adjacent an outer edge of the housing such that a gap is defined between the handle and a middle portion of the housing that is inwardly located relative to the handle.

14. A method of controlling a pet animal comprising:
    putting a leash on the pet, the leash comprising:
        a pliable handle, wherein the pliable handle comprises:
            a core,
            an outer sheath that surrounds the core to define a space between the core and the sheath, and a pliable material within the space between the core and the sheath, the pliable material being moveable within the space in response to force exerted on the sheath; and a lead line that is one of: (a) retractable and extendable from a housing to which the handle is attached and (b) attached to the handle;

using the handle to direct movement of the pet; and moving the pliable material within the space when holding the leash by the handle to use the handle to direct movement of the pet.

15. The method of claim 14, wherein the lead line is comprised of one of: a wire, a cable, an elongated strap, and an elongated elastomeric member.

16. The method of claim 14, wherein the lead line is attached to a connector configured to attach the leash to a collar for the pet.

17. The method of claim 14, wherein the pliable material is comprised of one of a gel, a liquid, a gas, and a putty.

18. The method of claim 14, wherein the sheath is transparent such that the pliable material is visible through the sheath.

19. The method of claim 14, wherein the pliable handle has a first end and a second end opposite the first end, the first and second ends being affixed to different portions of the housing adjacent an outer edge of the housing such that a gap is defined between the handle and a middle portion of the housing that is inwardly located relative to the handle.

20. The method of claim 14, wherein the leash also comprises:

a first fastener being positioned through a portion of the first end of the sheath to attach the first end of the sheath to the core and to attach a first end of the handle to the housing; and a second fastener being positioned through a portion of the second end of the sheath to attach the second end of the sheath to the core and to attach a second end of the handle to the housing.

* * * * *